D. E. True,
Lathe Tool.

N° 43,886.  Patented Aug. 16, 1864.

Witnesses
J. P. Hale Jr.
Frederick Curtis

Inventor
Daniel E. True
by his attorney
R. H. Eddy

UNITED STATES PATENT OFFICE.

DANIEL E. TRUE, OF LEOMINSTER, MASSACHUSETTS, ASSIGNOR TO HIMSELF AND GEORGE T. LINCOLN, OF SAME PLACE.

IMPROVEMENT IN DEVICES FOR TURNING SPHERES OR BALLS.

Specification forming part of Letters Patent No. 43,886, dated August 16, 1864.

*To all whom it may concern:*

Be it known that I, DANIEL E. TRUE, of Leominster, in the county of Worcester and State of Massachusetts, have invented a new and useful Mechanism to be used in Turning Spheres or Balls; and I do hereby declare the same to be fully described in the following specification and represented in the accompanying drawings, of which—

Figure 4:
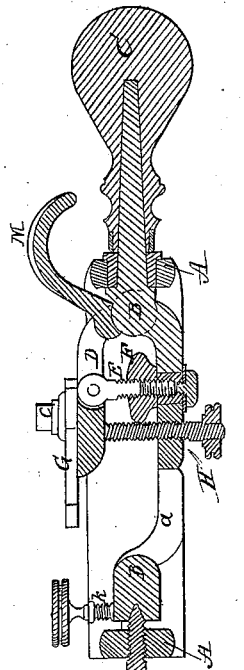
Figure 3:
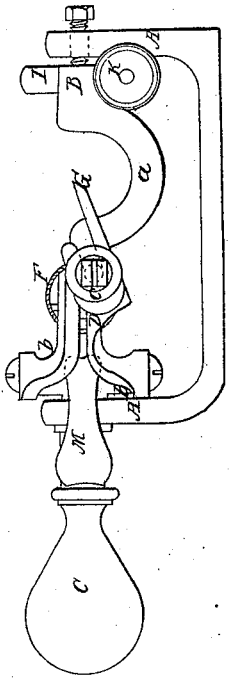
Figure 1:
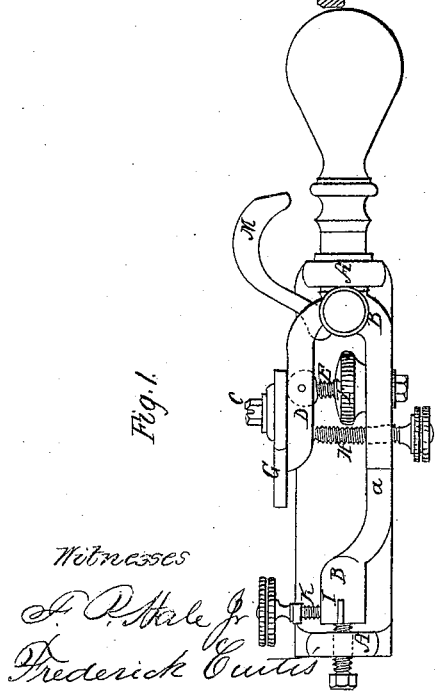
Figure 2:
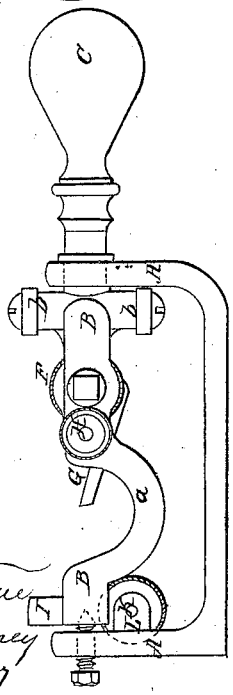

Figure 1 is a top view, Figs. 2 and 3 side elevations, and Fig. 4 a horizontal section, of such mechanism.

The mechanism in question is to be employed with a turning-lathe, or, in other words, a rotary mandrel for holding and revolving the material or block from which a sphere or ball is to be manufactured; and to this end the frame by which the rotary shaft of the mechanism is supported, and within which it is to be revolved while in use, is either to rest on the bed rails of the lathe or mandrel, or so as to be sustained by a carriage placed therein and adapted to such rails so as to be capable of being moved thereon longitudinally of them.

In the drawings, A denotes the said frame, which is formed substantially like the puppet-head of a turning-lathe, and supports a rotary stock or shaft, B, which is provided with a handle, C, by the aid of which it may be put in rotation. The shaft B, as shown in the drawings, is not straight between its points of support, but is crooked in two directions, it being particularly formed with a semicircular or about a semicircular crook or bend, *a*, which is to so extend underneath the ball or partially around it while it may be in the act of being turned as to enable the axis of the shaft to pass through the center of the ball, for unless it does pass through it the ball will not be turned truly spherical, but will be oblate. To this shaft B an arm or tool-carrier, D, is hinged, as shown at *b*, and is provided with an adjusting-screw, E, which is hinged to it and screws through a rotary nut, F, which is stationary within the shaft, except in being capable of being revolved on the screw, the same being in order to move the free end of the tool-carrier either toward or away from the shaft. A cutting-tool or cutter, G, is to be affixed to the carrier by a clamp-screw, *c*, or by any other suitable means. A stop-screw, H, screws through the shaft and serves to arrest the inward movement of the tool-carrier when the ball may have been turned to the required diameter, the adjusting mechanism of the carrier being for the adjustment of the tool to make the successive cuts required for the reduction of the ball blank or block, such ball-blank being supposed to be supported on one end of the lathe-mandrel, either by a screw or a chuck on the said end. Furthermore, there is a stop, I, extended from the shaft in manner and position as shown in Figs. 1, 2, and 3, there being an adjustable stop or screw, K, arranged underneath the shaft and supported by a projection, L, of the frame A. The two stops I K serve to arrest the rotary movement of the shaft B when the cutter may have been passed a proper distance over the ball. There is also applied to the shaft B, and in the position as shown in the drawings, a thumb-lever, M, which by the pressure of a person's thumb, while his hand may be grasping the handle C, may be borne firmly against the cutter-carrier and so as to force its free end in a direction away from the shaft B. The purpose of this lever is to firmly maintain the tool in position relatively to the axis of motion of the shaft while such shaft may be in the act of being revolved for the purpose of causing the tool to cut. Owing to wear of the adjusting-screws or the joints of the mechanism, it has been found difficult to maintain the cutter at one invariable distance from the axis of motion of the shaft while the cutter may be in the act of being revolved and be at work. By means of the thumb-lever, however, the cutter may be held securely, so as not to materially change its position under such circumstances.

My mechanism is for correctly turning spheres of ivory or other material and particularly billiard and comb balls, which it will execute to great perfection and dispatch. In using it the shaft is to be revolved so as to cause the cutter to rotate in a circular path about the block to be reduced by it, such block being in revolution in a plane at right angles to that of the path of movement of the cutter.

What I claim as my invention in respect to the mechanism as above described is as follows, viz:

1. The combination of the adjustable tool-carrier D and its adjusting mechanism—viz., the screw E and nut F—with the rotary shaft B, the same being as and for the purpose specified.

2. The rotary shaft B, as made with the crook or bend a, when such shaft is combined with the tool-carrier D, for use substantially as explained.

3. The combination and arrangement of the stop-screw H with the rotary shaft B, the tool-carrier D, and its adjusting mechanism.

4. The combination of the stops I K with the rotary shaft B, the tool-carrier D, and its adjusting mechanism.

5. The combination of the thumb-lever M with the rotary shaft B, the tool-carrier D, and its adjusting mechanism.

D. E. TRUE.

Witnesses:
R. H. EDDY,
F. P. HALE, Jr.